3,825,477
FLUIDIZED BED REACTOR
Joseph F. McMahon, Clinton, N.J., assignor to Foster Wheeler Corporation, Livingston, N.J.
Filed May 12, 1972, Ser. No. 252,891
Int. Cl. C10g 7/00
U.S. Cl. 196—126                                  4 Claims

ABSTRACT OF THE DISCLOSURE

A fluidized bed reactor for producing a gas rich in ethane and methane in which coking is inhibited and which operates at high efficiency. Oil and hydrogen are reacted in the reactor which has means to insure thorough mixing of the oil with the coke particles.

BACKGROUND OF THE INVENTION

As natural gas becomes less plentiful, it becomes necessary to find apparatus and methods for producing substitute natural fuel gases economically. Generally, gases rich in ethane and methane, which can serve as natural gas substitutes, can be produced by reacting oil and hydrogen at high temperatures and pressures. The oil which may be used in this process may be crude oil, distillate oil or other hydrocarbon oil. One way to react the oil with the hydrogen is to lead a mixture of oil and hydrogen into a reactor containing a fluidized bed of coke particles where the temperature and pressure are high enough to bring about the necessary reaction.

There are several problems in such reactors. Non-uniform mixing of oil, hydrogen and fluidized coke particles can lead to high concentrations of oil in certain locations in the fluidized bed. Since the reaction between oil and hydrogen gives off considerable amounts of heat, localized high concentrations of oil can lead to localized high temperatures (hot spots which adversely effect the desired gas yield, thereby decreasing the efficiency of the process).

Non-uniform mixing of oil, hydrogen and fluidized coke particles can also lead to agglomeration of the coke particles and the formation of carbon deposits inside the reactor. Agglomeration of fluidized coke particles causes a defluidization of the particles, which limits the efficiency of the process. Failure to contact oil feed and coke particles with a sufficient degree of uniformity causes a part of the oil to pass through the fluidized bed without sufficient degree of reaction with hydrogen so that the coke deposits are formed which can block passage of gas through the reactor.

SUMMARY OF THE INVENTION

It is an object of the present invention to overcome drawbacks found in the prior art such as those discussed above. Accordingly, the lower portion of the fluidized bed is provided with a plurality of risers having a sufficiently small cross-section that at any given time a portion of the coke particles rise in them at a considerable speed to induce a fairly thorough mixing of the oil and coke particles.

DETAILED DESCRIPTION OF THE PREFERRED EMBODIMENT

Figure 1:
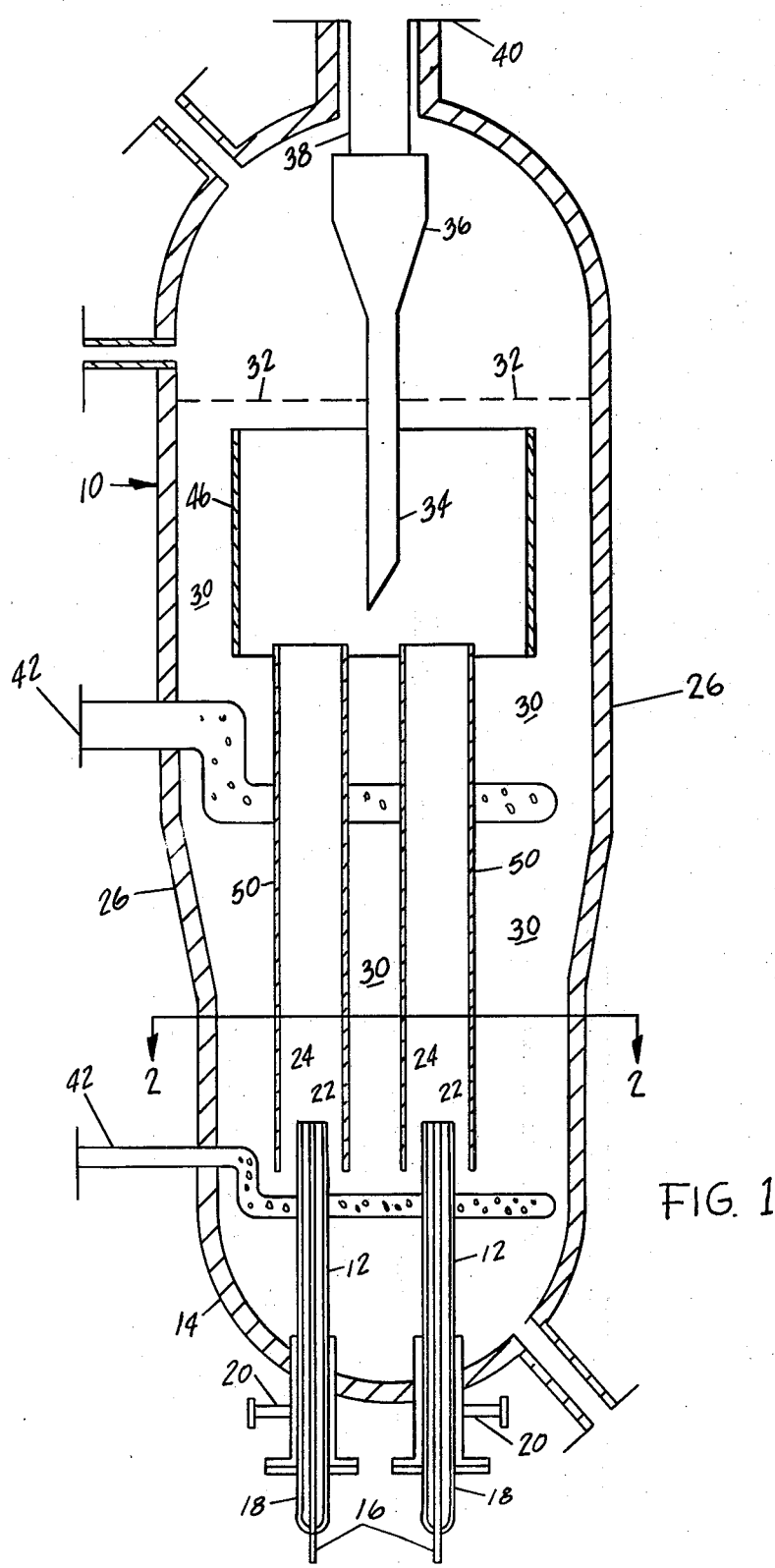
FIG. 1 is a side view, partly in section, of a reactor made in accordance with the present invention.

There is shown in FIG. 1 a fluidized bed reactor 10 made in accordance with the present invention. It has a plurality of inlet pipes 12 which project through the bottom 14 of the reactor to the interior thereof. Each of the inlet pipe assemblies 12 includes an oil feed pipe 16 which is placed coaxial with and inside of a hydrogen gas feed pipe 18. The gas is fed through connections 20 and passed upwardly through the gas feed pipes 18 to the ends 22 thereof, where the gas leaves the pipes and passes into the reactor. The oil passes upwardly to the ends 24 of the oil feed pipes where it also passes out of the pipes and into the interior of the reactor. The oil and gas mixture react to form a gas rich in methane and ethane within the side wall 26 of the reactor 10 in a fluidized bed 30 which extends from the bottom of the reactor to the upper level 32 thereof. The gas which is so formed, passes upwardly through a central pipe 34 to a separator 36 which is preferably of the cyclone type to an outlet pipe 38 and then through the outlet 40.

In order to maintain the coke particles in a fluidized state in the fluidized bed 30, hydrogen gas is fed through perforated pipes 42 which pass through the sides of the reactor vessel 10 to locations therein where the hydrogen will contact coke particles. The pipes are, of course, perforated only in the portions thereof which are inside the reactor vessel.

In order to provide a dense phase of the fluidized bed 30 where the coke particles move slowly and through a phase of sufficient cross-sectional area that the reaction will be complete, an upper riser 46 is provided. The coke particles move upwardly through the riser 46 because of the pressure from the gas entering at the lower portion of the reaction vessel. Particles coming to the top of the fluidized bed 30 reverse their direction to flow slowly downwardly in the annular space between the riser 46 and the side wall 26.

Figure 2:
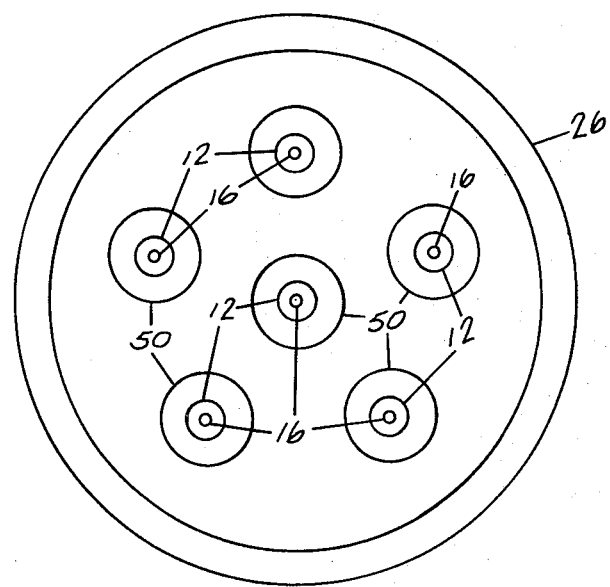
FIG. 2 is a view, partly in section, taken substantially along the line 2—2 of FIG. 1.

It has already been explained how decreased efficiency and coking in the area adjacent to the outlet in fluidized bed reactors are often caused by a failure to sufficiently mix the oil and the coke particles in the fluidized bed. To that end, a plurality of mixing risers 50 are provided in the lower portion of the fluidized bed reactor 10. They are shown in plan in FIG. 2. The inlet pipe assemblies 12, each consisting of a oil pipe 16 and a coaxial gas pipe 18 which extend upward within the mixing risers 50 to a level above the bottoms of the risers 50 which extend above the bottom of the upper riser 46. This arrangement allows some of the coke particles passing downwardly, between the upper riser 46 and side wall 26, to pass all of the way down through the reactor to a level low enough that such coke particles can then pass upwardly through the mixing risers 50 and then after passing through the riser 50, some particles reverse their direction to pass downwardly outside of the mixing risers 50 to the bottom of the reactor and some continue up through the upper riser 46. The reversals of direction and friction of the particles passing through the mixing risers creates turbulence which mixes the oil thoroughly with the coke particles.

With this arrangement, each of the particles in the fluidized bed 30 will, from time to time, pass at a relatively high speed through one of the mixing risers 50 because of the relatively small cross section of the upward flowing stream of particles through the risers 50. Moreover, some of the particles leaving the risers 50 will reverse their direction to flow downward and then reverse their direction to flow upward through the risers 50. The result is a degree of turbulence which will assure that the oil coming in through the oil feed pipes 16 will be thoroughly mixed with the particles. This in turn, will overcome the low efficiency and coking problems which have already been discussed.

The foregoing describes but one preferred embodiment of the present invention, other embodiments being possible without exceeding the scope of the present invention as defined in the following claims.

What is claimed is:
1. A fluidized bed reactor producing a gas rich in ethane and methane comprising
a vessel,
an inlet for admitting oil and hydrogen, said inlet including an oil feed pipe means that is placed coaxially with and inside of a hydrogen gas feed pipe means and said inlet being adjacent to the bottom of said vessel,
an outlet for directing the product gas out of said vessel, said outlet being adjacent to the top of said vessel,
a mixing riser above said inlet extending vertically in the lower portion of said vessel said mixing riser beng of a larger diameter than coaxial with said inlet so that said oil and hydrogen are admitted into said mixing riser,
said mixing riser being one of a plurality of mixing risers and said inlet being one of a plurality of inlets,
an upper riser extending vertically higher than and in communication with said mixing riser, said upper riser being of considerably greater cross-sectional area than said mixing riser so that coke in the fluidized bed will continuously pass upwardly through said mixing riser and said upper riser and downwardly in the spaces outward of said risers.

2. The reactor defined in claim 1 wherein the bottom of said upper riser is below the top of said mixing riser.

3. The reactor defined in claim 1 further comprising a cyclone separator between said upper riser and said outlet to prevent coke particles from reaching said outlet.

4. The reactor defined in claim 1 wherein the top of said inlet is above the bottom of said mixing risers.

References Cited

UNITED STATES PATENTS

| | | | |
|---|---|---|---|
| 2,709,675 | 5/1955 | Phinney | 201—31 |
| 3,484,219 | 12/1969 | Dent et al. | 23—288 S |
| 2,948,673 | 8/1960 | Hemminger | 208—164 |
| 2,548,015 | 4/1951 | Goodson et al. | 196—126 X |
| 3,268,435 | 8/1966 | Sellin | 196—127 X |
| 1,380,067 | 5/1921 | Koch | 196—126 U X |
| 3,254,019 | 5/1966 | Mitchell et al. | 208—164 X |

NORMAN YUDKOFF, Primary Examiner

D. EDWARDS, Assistant Examiner

U.S. Cl. X.R.

23—288 S; 196—127, 129; 208—164